July 31, 1951 G. H. LEONARD 2,562,535
ELECTRIC TOASTER
Filed Nov. 16, 1946 5 Sheets-Sheet 4
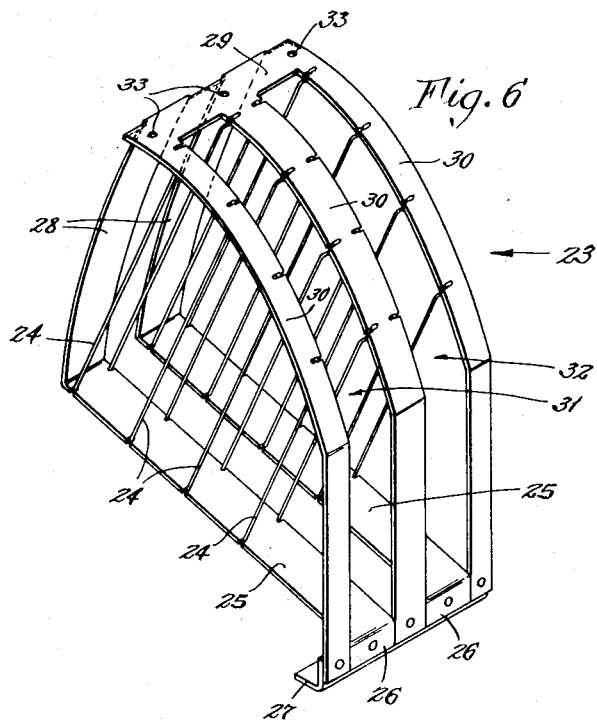
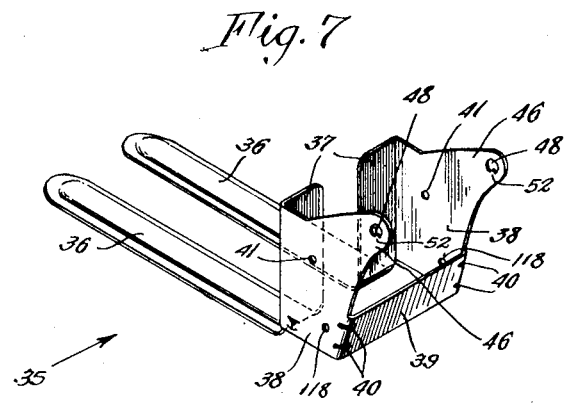
INVENTOR.
George Hamlin Leonard
BY
Johnson, Kline and Hensel
ATTORNEYS July 31, 1951 G. H. LEONARD 2,562,535
ELECTRIC TOASTER
Filed Nov. 16, 1946 5 Sheets-Sheet 5
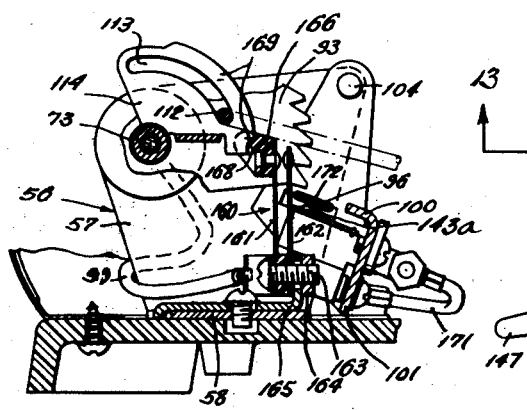
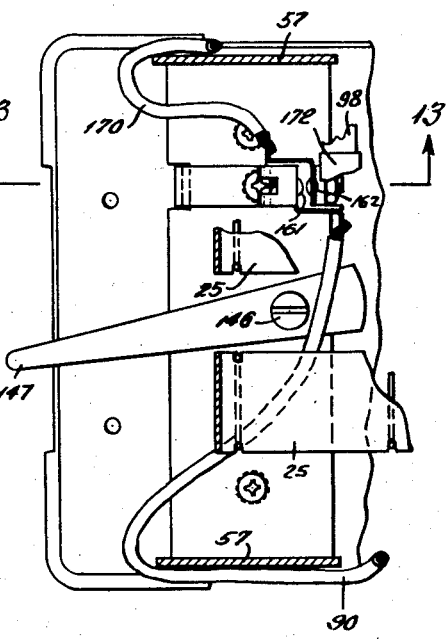
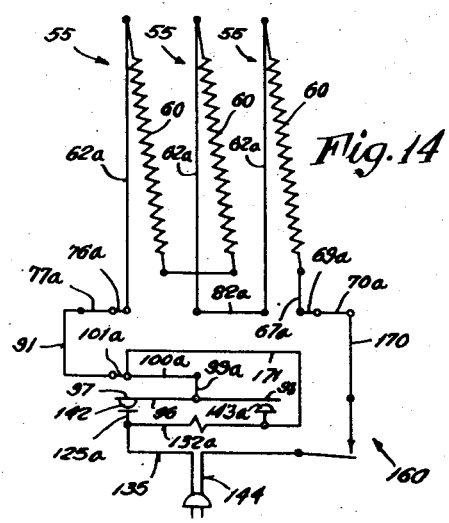
INVENTOR.
George Hamlin Leonard
BY
Johnson, Kline and Hensel
ATTORNEYS

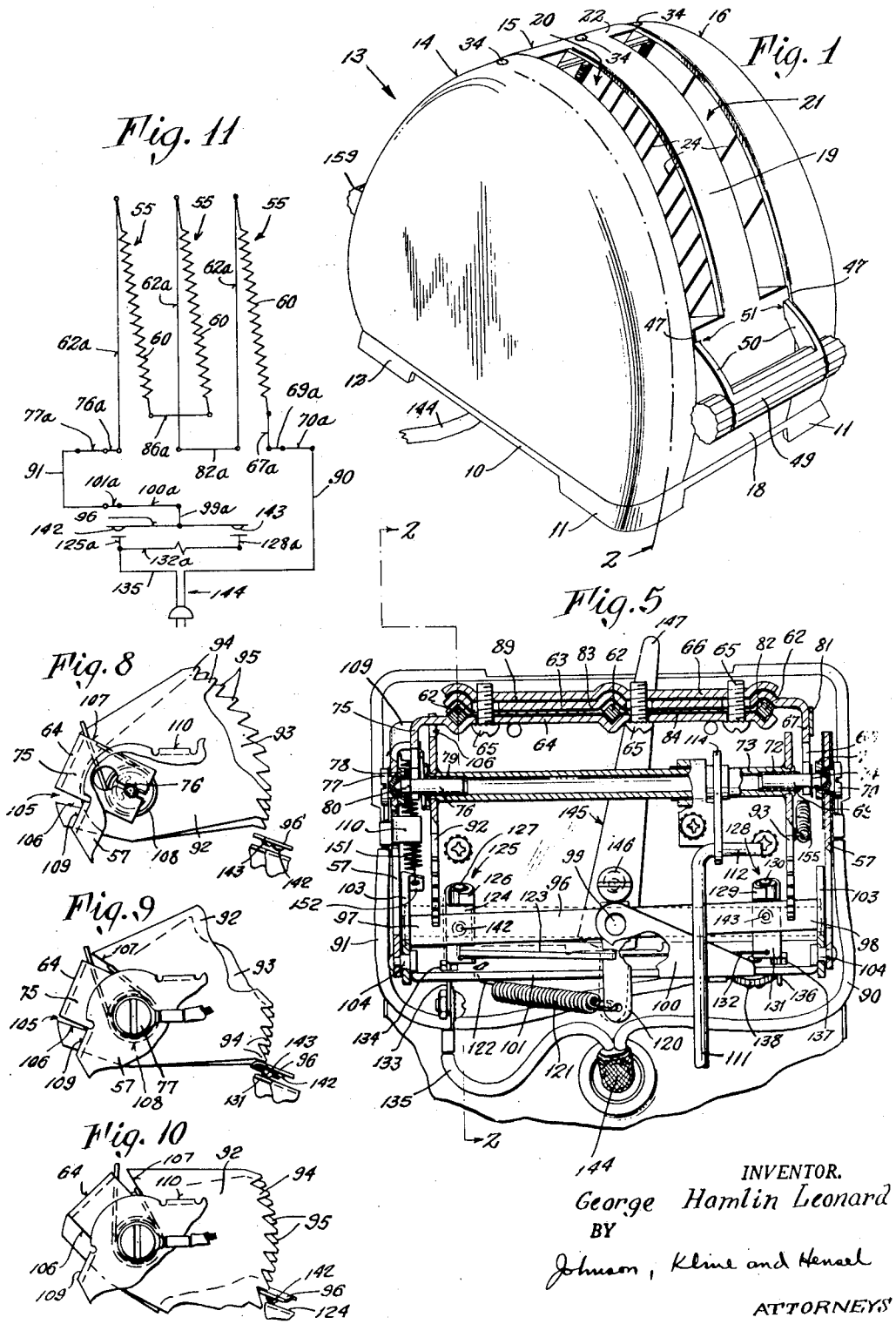

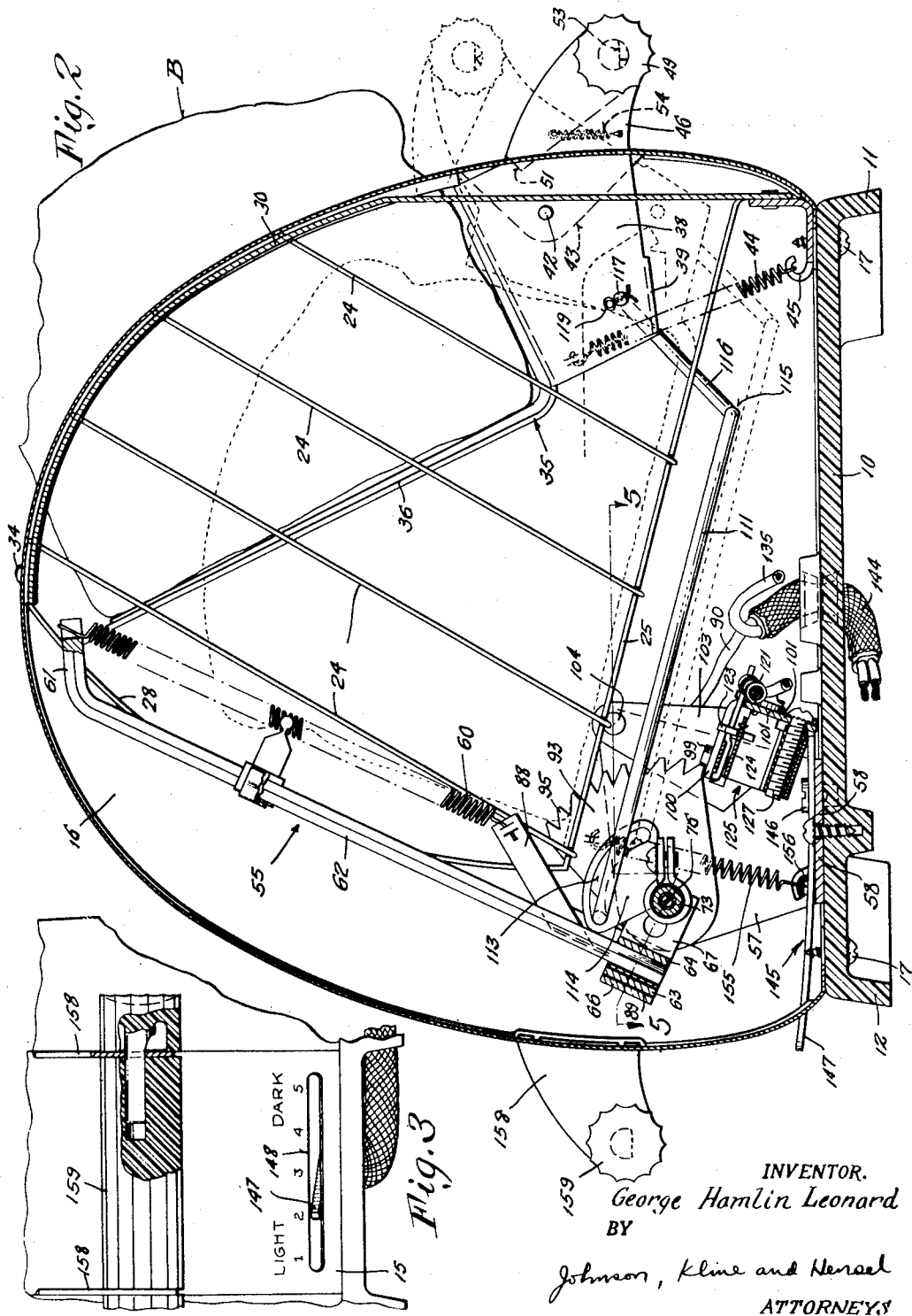

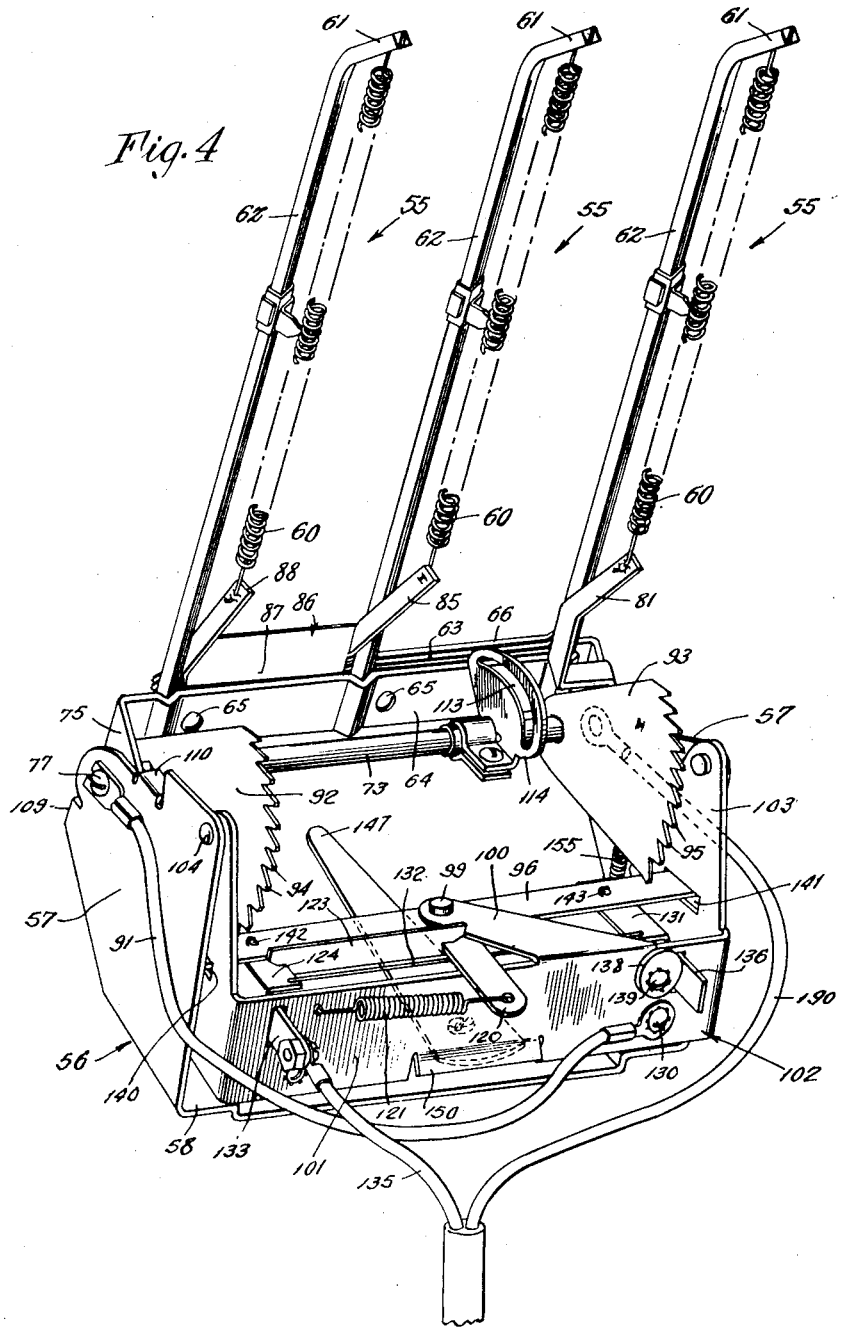

Patented July 31, 1951

2,562,535

UNITED STATES PATENT OFFICE 2,562,535

ELECTRIC TOASTER

George Hamlin Leonard, Fairfield, Conn., assignor to Arthur A. Johnson, Bridgeport, Conn., as trustee Application November 16, 1946, Serial No. 710,273

17 Claims. (Cl. 99—331)

This invention relates to semi-automatic electric toasters.

An object of the invention is to provide an improved, economical, household-type semi-automatic toaster having a rapid cycle of operation to produce uniformly toasted bread at a rapid rate, thereby reducing considerably the usual waiting period heretofore necessary with toasters.

A further object of the invention is to provide a toaster as above which uses a relatively small amount of electricity and is therefore extremely economical to operate.

Another object of the invention is to provide a toaster as characterized above, in which the actuation of the operable parts may be easily and conveniently carried out without requiring relatively heavy pressures or large actuating movements.

A feature of the invention is the provision of a toaster wherein, if the toasted bread should not be removed immediately, it will not be subjected to cooling influences which tend to remove the warmth therefrom, nor will it be further toasted so as to undesirably darken the bread.

Another feature of the invention is the provision of an improved semi-automatic household toaster which is fabricated of subassemblies readily separable from each other, one subassembly having the base included in it, and having supported on the base the heating element and timer or escapement structures, whereby these parts may be made to pass through their cycle of operations and may be checked for correct operation or inoperativeness while separated from the toaster housing and therefore easily accessible.

A still further object of the invention is to provide a semi-automatic toaster of the above type in which the casing or housing remains relatively cool, thereby reducing the likelihood of burns etc., if an operator should inadvertently touch the casing.

In accomplishing these objects and advantages, a novel organization is provided wherein elongate wand-shaped movably mounted heating elements are made to traverse slices of bread which have been conveyed to a toasting area by a movable bread carrier, the movement of the latter automatically initiating the traversing movement of the heating elements and effecting the energization thereof.

The wand-shaped heating elements are surrounded mostly by air, and due to the absence of closely juxtaposed or contacting supporting surfaces which tend to conduct heat away from the elements, these latter come up to operating temperature very quickly and provide a very high concentrated heat which rapidly toasts the adjacent areas of the bread. In consequence, the traversing movements of the elements are quite rapid and the entire interval during which the bread is being toasted is relatively short, thereby reducing the time required to produce toast and at the same time reducing the total energy consumption. Due to the heating elements having a small overall area, and being movable during their energization, the heat transmitted to the casing or housing of the toaster is greatly reduced so that the temperature of the latter is relatively low during operation of the toaster.

In conjunction with the above heating element and bread-supporting structure, a novel and improved timer or escapement mechanism is provided which is of extremely simple construction and is operable from the source of electricity supplied for heating the heating elements of the toaster. The escapement is so organized that its operation is reliable at all times and is not interfered with by crumbs, dirt, etc.; also it may be readily adjusted to provide for varying degrees of lightness or darkness of the toast.

A driving connection is provided between the escapement mechanism and the heating elements, which includes a lost-motion coupling and a spring element so arranged that when the heating elements are initially energized they are prevented from moving until they develop their normal operating temperature and the bread is conditioned for toasting. By this organization uniformity of toasting of the bread throughout its entire area is insured.

The bread carrier is operably connected with the heating elements in such a manner that in addition to automatically providing for their traversing movement and energization, it automatically returns the elements to starting position upon being shifted to its inoperative, bread-projecting position.

Due to the escapement mechanism being operated from the source of electricity supplied to the heating elements, the necessity of employing heavy springs for operating the mechanism is avoided. Normally such springs must be loaded by the operator in actuating the manually operable parts of the toaster, and therefore such parts generally require considerable pressure to actuate. With the present construction the springs employed to provide for automatic operation of the various parts are relatively light and do not offer any substantial hindrance to resetting of the toaster parts, or actuation of the parts to initiate the toasting cycle.

A further feature of the invention resides in the simplicity of the parts and structures provided to accomplish the desired results, and the ease and economy of fabrication of the parts and assemblies.

Other features and advantages will hereinafter appear.

In the accompanying drawings:

Figure 1 is a perspective view of the improved toaster of the present invention.

Fig. 2 is a vertical section through the toaster, taken from front to rear along a plane located at the left side of the toast-receiving openings of the housing, the location of the section being generally indicated by the dot-and-dash line 2 of Fig. 1, and by a similar line in Fig. 5, listed below.

Fig. 3 is a fragmentary rear elevation of the lower portion of the toaster, showing the adjustment device and the rear carrying handle.

Fig. 4 is a perspective view of the heating element and timer assembly of the toaster.

Fig. 5 is a horizontal section taken through the assembly of Fig. 4, on the line 5—5 of Fig. 2.

Fig. 6 is a perspective view of the grating assembly of the toaster.

Fig. 7 is a perspective view of the bread carrier.

Fig. 8 is a fragmentary side elevational view of the escapement mechanism and lost-motion driving connection between the same and the heating elements, the parts being in positions corresponding to inoperative condition of the toaster.

Fig. 9 is a view like Fig. 8, but showing the escapement at the start of its movement.

Fig. 10 is a view like Figs. 8 and 9, but showing the escapement well along in its movement, the heating element support having been picked up by the escapement and shifted an extent to cause a partial traverse of the bread by the heating elements.

Fig. 11 is a schematic wiring diagram of the toaster shown in the preceding ten figures.

Fig. 12 is a fragmentary horizontal section through the lower portion of a heating element and timer subassembly, showing a modified form of electrical control for governing the energization of the heating element.

Fig. 13 is a fragmentary vertical section taken on line 13—13 of Fig. 12, and

Fig. 14 is a schematic wiring diagram of a toaster having the modified electrical control shown in Figs. 12 and 13.

Referring to Figs. 1 and 2, the toaster illustrated as embodying the invention comprises a base 10 which is generally rectangular in outline, having front feet 11 and rear feet 12, the base being shown as formed of a molded insulating composition such as phenolic resin or the like. A housing 13 is mounted on the base 10, the said housing being preferably formed of three main sections, a left-end section 14, a center section 15 and a right-end section 16. The housing 13 is generally bulbous in shape, and the end sections 14 and 16 thereof are substantially identical to each other except that one is the reverse or opposite of the other. The end sections 14 and 16 are in the form of shallow dished segments, and are secured to the base 10 by screws 17, Fig. 2.

As shown in Fig. 1, the center section 15 of the housing is in the shape of a thin curved band having a wide front lower portion 18 spanning the space between the end sections 14 and 16, having a relatively narrow portion 19 extending upwardly from the lower portion 18 to the top of the housing in spaced relation with the end sections 14 and 16 and providing bread-receiving openings 20 and 21 respectively between the said sections, and having a relatively wide rear portion 22 extending from the top of the housing downward to the rear edge of the base and also spanning the space between the end sections 14 and 16. The center section 15 of the housing is also secured to the base 10 by screws 17 in the same manner as the end sections 14 and 16.

For the purpose of guiding and positioning slices of bread B which are inserted in the bread-receiving openings 20 and 21 of the housing 13, a grating assemblage 23 is provided, Fig. 6, the said assemblage having a plurality of parallel pairs of wire guides 24 which, when the assemblage is supported in the housing, extend diagonally downward from the mouths of the bread-receiving openings on both sides of the spaces defined by the openings and serve to retain the slices of bread in upright position either when partially or wholly within the housing 13. The grating assemblage 23 comprises a sheet metal frame having a pair of flat parallel base portions 25 under which the wire guides 24 are looped and to which they are secured. The front ends 26 of the base portions 25 are bent downwardly and secured by rivets to a transverse supporting angle 27 which extends across the front lower portion of the housing 13 and is secured to the base 10 by the screws 17. The rear ends of the base portions 25 are joined to upstanding portions 28 which are curved forwardly and terminate in a crossbar 29, which latter is connected with rearwardly curved upstanding front portions 30 the lower ends of which are secured to the supporting angle 27. The front portions 30 are three in number, and are staggered with relation to the two rear upstanding portions 28, the arrangement being such that bread-receiving openings 31 and 32 exist between the front portions 30 to correspond with the bread-receiving openings 20 and 21 of the housing 13. The upper ends of the wire guides 24 are secured to the front upstanding portions 30 of the frame for anchorage in any suitable manner as by welding.

The crossbar 29 of the grating assemblage 23 has a plurality of apertures 33 for receiving rivets 34, Fig. 1, by which the upper portions of the housing sections 14, 15 and 16 are rigidly secured together.

In accordance with the invention a novel, pivotally mounted bread carrier 35 is provided, Figs. 2 and 7, said carrier being preferably formed of a single metal stamping and having a pair of embossed, generally flat bread-supporting portions 36 which at their front ends are joined to upstanding portions 37 the remote side edges of which latter are integral with side plates 38 connected together at their front lower portions by a crossbar or strut 39. For purposes of rigidity, embossed ribs 40 are provided in the crossbar 39 and side plates 38, and as already mentioned the bread-supporting portions 36 of the bread carrier are embossed or crowned slightly to prevent their becoming bent.

The bread carrier 35 is pivotally mounted in the housing 13, and for this purpose the side plates 38 are provided with apertures 41 which receive a pivot pin 42, Fig. 2, the latter being carried in a pair of apertured inwardly extended ears 43 formed as part of the center section 15 of the housing 13. The bread carrier is pivotally movable between an inoperative bread-projecting position shown in Fig. 2 in full lines, and an operative bread-toasting position shown in broken lines in this figure. For this latter position the bread carrier is lowered in the housing 13, the bread-supporting portions 36 of the carrier extending between the respective pairs of wire guides 24 of the grating assemblage and resting on the base portions 25 thereof.

The location of the pivot pin 42 is such, with respect to the center of gravity of the bread carrier 35 that gravity will normally urge the bread carrier and bread to the operative bread-toasting position shown by the broken lines in Fig. 2. For the purpose of supplementing the action of gravity in this respect, a helical expansion spring 44 is provided having one end anchored in one of the side plates 38 of the bread carrier and the other end anchored to a hook 45 on the supporting angle 27 of the grating assemblage 23.

For the purpose of enabling the bread carrier 23 to be manually actuated between its operative and inoperative positions, the side plates 28 thereof have extensions or arms 46 which project through slots 47 provided for the purpose between the housing sections 14, 15 and 16, the said arms having apertures 48 by which a fluted bar-shaped handle 49 is supported.

In accordance with the invention a novel latching mechanism is provided to enable the bread carrier 23 to be locked in its inoperative bread-projecting position and to be easily and quickly manually released therefrom for movement to its operative bread-toasting position. The latching mechanism comprises a pair of locking arms 50 extending from the handle 49, the ends of the locking arms being adapted to extend into locking recesses 51 in the center section 15 of the housing 13. The handle 49 is mounted so that it can be turned through an arc, thereby to shift the locking arms 50 thereof laterally and upward to remove the tip portions of the arms from the locking recesses 51, and by this operation the latching mechanism is released so that the bread carrier 35 is free to move to its operative position. Stops are provided to limit the turning movement of the handle 49, the said stops being in the form of nibs 52 projecting into the apertures 48 in the arms 46 of the bread carrier, and the shank portions of the handle 49 which extend through the said apertures are provided with flats 53 cooperable with nibs 52 to limit the turning movement of the handle 49 to a relatively small arc. The said handle and the locking arms 50 thereof are normally yieldably held in the locking position shown in Fig. 2 by a helical expansion spring 54, one end of which is secured to one of the arms 50 and the other end of which is secured to the associated arm 46 of the bread carrier.

According to the present invention a plurality of wand-shaped pivotally mounted heater assemblies 55 are provided within the housing 13, Figs. 2 and 4, the said assemblies being movable as a unit to traverse the slices of bread B carried in the bread carrier 35 so as to toast substantially all areas of the surfaces of the bread. As shown, the heater assemblies 55 are three in number, and are located so that the center assembly traverses the adjacent or inner sides of two slices of bread B carried by the supporting portions 36 of the bread carrier 35, and so that the outer assemblies traverse the outer surfaces of the said slices of bread. The heater assemblies 55 are carried at their lower ends by a clamping assemblage pivotally mounted on a generally U-shaped bracket 56, the latter having upstanding arms 57 and a yoke or base portion 58 secured to the rear interior of the base 10. Referring to Fig. 2, the heater assemblies 55 may thus pivotally move from an upright starting position shown by the full lines in Fig. 2 to a generally horizontal lowered position shown in broken lines. In so doing, the assemblies traverse the surfaces of the slices of bread B (indicated in broken lines) which are carried by the bread carrier 35, when the latter is in operative position, and upon completion of the traversing movement the heater assemblies may be raised and returned to the starting position in readiness for another cycle of operations.

Each heater assembly 55 comprises a heating element in the form of an elongate spiral coil of heater wire 60 at its upper end secured to the forwardly bent tip 61 of a rigid supporting bar 62, the lower end of which latter is supported by being clamped between a pair of clamping strips 63 and 64 held together by screws 65 threaded into a clamping plate 66. One end 67 of the clamping strip 63 is bent forwardly at substantially right angles and is apertured and slotted at 68 to receive and frictionally grip under pressure a pivot pin 69 carried by a bearing screw 70 insulatedly mounted on one arm 57 of the bracket 56 and secured to the arm by a locking nut 71. The pivot pin 69 extends into an insulating bushing 72 carried in one end of a tubular shaft 73 so that the latter is rotatably supported at the said end by the upstanding arm 57 of the bracket 56. A split retainer ring 74, such as a Tru-arc ring, is provided in the pivot pin 69 to provide a shoulder against which the end 67 of the clamping strip 63 is positioned.

The clamping strip 64 at one end 75 is bent forwardly substantially at right angles and apertured and slotted to receive and frictionally grip a second pivot pin 76 which is received in a bearing screw 77 secured by a nut 78 to the other upstanding arm 57 of the bracket 56. The pivot pin 76 extends into an insulating bushing 79 which is carried in the other end of the tubular shaft 73, thereby rotatably supporting the said other end on the associated arm 57 of the bracket 56. A split Tru-arc retainer ring 80 is carried by the pivot pin 76 to provide a shoulder against which the end 75 of the clamping strip 64 is positioned.

The electric circuit through the heater wires is effected as follows: From the bearing screw 70 current flows through the pivot pin 69 to the bent end 67 of the clamping strip 63. The said end 67 of the clamping strip carries an upstanding arm 81 to which the lower end of the right-hand heating element 60 is secured, and current therefore flows through the arm 81 to the said element. From the upper end of the right-hand heating element 60 current flows through the rigid supporting bar 62 to a connector strip 82, Fig. 5, interposed between the bar and the clamping strip 63, and also interposed between the latter and the center supporting bar 62. A thin web of insulation 83 is interposed between the connector strip 82 and the clamping strip 63 to insulate the said strips from each other, and a second insulating web 84 is interposed between, on the one hand the connector strip 82 and the center and right-hand supporting bars 62, and on the other hand the clamping strip 64 to insulate the latter from the said bars and connector strip.

By this organization current may pass from the right-hand supporting bar 62 to the center supporting bar through the connector strip 82 without being diverted into any other channels. From the upper tip of the center supporting bar 62 current flows into the center heating element 60, and the lower end of the said element is secured to an arm 85 of a generally U-shaped connector strip 86 having a base portion 87 clamped between the clamping strips 63 and 64, and having a second arm 88 to which the lower end of the left-hand heating element 60 is secured. The base portion 87 of the connector strip 86 is insulated from the clamping strips 63 and 64 by the webs of insulation 83 and 84, the latter web being interposed between the left-hand supporting bar 62 and the base portion 87 of the connector strip 30 so as to insulate the said base portion and bar from each other.

Current will therefore flow from the center heating element 60 through the connector strip 86 to the lower end of the left-hand element 60, and from the upper end of the said element to the left-hand supporting bar 62, from which latter it will pass to the clamping strip 64 and end portion 75 thereof, and thence to the pivot pin 76 and bearing screw 77.

As seen in Fig. 5, to provide for proper insulation of the assemblage of clamping strips and supporting bars of the heating elements, the apertures in the clamping strip 63 which admit the screws 65 are enlarged to provide clearance around the screws, and a web of insulation 89 is interposed between the clamping plate 66 and the clamping strip 63 to insulate the one from the other, and thereby to complete the insulation between the clamping strips 63 and 64.

Electric current is brought to and from the bearing screws 70 and 77 by wires 90 and 91 which are respectively connected with the said screws, and by the organization as described above the heating elements 60 may be efficiently energized while at the same time being pivotally mounted on the bracket 56 so that they are movable forwardly and downwardly through an arc to traverse the slices of bread B in the bread carrier 35. It will be noted that, by the provision of the apertured and slotted end portions 67 and 75 of the clamping strips 63 and 64, a frictional gripping of the respective pivot pins 69 and 76 under continual pressure is had, thereby enabling these latter to carry a relatively heavy current for energization of the heating elements 60.

The schematic representation of Fig. 11 diagrammatically illustrates the connections from the wires 90 and 91 through the heating elements 60. The wire 90 is shown as being connected with a line 70a representing the pivot screw 70, with a line 69a representing the pivot pin 69, with a line 67a representing the bent end portion 67 of the clamping strip 63. The right-hand heating element 60, connected with the line 67a is also connected with a line 62a representing the right-hand supporting bar 62.

The line 62a is connected with a line 82a representing the connector strip 82, and the line 82a connected with a central line 62a representing the center supporting bar 62. The center heating element 60 connected with the line 62a is also connected with a line 86a representing the connector strip 86, and the left-hand heating element 60 connected with the line 86a is also connected with a left-hand line 62a representing the left-hand supporting bar 62. The left-hand line 62a is connected with a line 76a representing the pivot pin 76, and with a line 77a representing the bearing screw 77, the said line 77a being connected with the lead wire 91.

By the provision of the wand-shaped heating elements 60 which are made to traverse the entire surfaces of the slices of bread B a highly concentrated heat is produced for the toasting operation, in contradistinction to the distributed heat of prior toasters having heating elements which cover a relatively large area. Several advantages result from the use of the wand-shaped heat-concentrating elements 60. Since they are not in contact with or closely juxtaposed to any supporting surfaces which might conduct the heat away from them, they will operate at a higher temperature with less current, and also come up to operating temperature much more quickly than in constructions where the heater wire is wrapped around a mica or ceramic or other supporting structure and is either in contact with said structure or closely adjacent thereto. Due to the higher operating temperature and higher heat concentration of the wand-shaped elements 60 they toast the adjacent surfaces of the bread very quickly, and therefore the entire bread-toasting operation is carried out in much less time than in conventional toasters. As a result, a substantial saving of electricity is effected, and the toasting may be accomplished with approximately half the energy consumption required by conventional toasters. Due to the rapidity of the toasting operation and the small area of the heating elements, the housing 13 is not heated to any considerable extent and therefore remains relatively cool as compared with other toasters, and is less likely to cause burns when touched.

According to the present invention a novel timer or escapement mechanism is provided for controlling the rate of the traversing movement of the heating elements 55 past the slices of bread B, together with a novel circuit control and operating connection between the bread carrier 35 and the heating elements 55 to produce a desirable and advantageous semi-automatic operation of the toaster. The organization is such that, as the slices of bread B are inserted in the bread carrier 35 and the latter shifted to its operative position, the energization of the heating elements and traversing movements of the latter are automatically carried out to quickly and efficiently toast the bread, and upon completion of the toasting the heating element circuit is automatically opened, the toast being available for removal at any time, and until removal being stored without exposure to cooling influences. The timing or escapement mechanism is extremely simple, having few working parts which are rugged and fool-proof in operation and are not easily interfered with by breadcrumbs, dirt or other foreign matter, so that the operation of the device is reliable throughout a long period of use.

The timing or escapement mechanism comprises a pair of rack strips or plates 92 and 93 which are rigidly mounted on opposite ends of the tubular shaft 73, the said plates being in the form of ratchet segments and having respectively buttress teeth 94 and 95 disposed in a circle about the shaft 73 as a center. The teeth 94 of one ratchet segment are located to alternate with the teeth 95 of the other ratchet segment, and the said segments are cooperable with an escapement or detent lever 96 extending transversely between the segments, the ends 97 and 98 of the detent lever being engageable respectively with the teeth 94 and 95 of the segments. The detent lever 96 is pivotally carried by a stud 99 mounted on an arm 100 extending diagonally inward from the base portion 101 of a generally U-shaped frame 102 having side arms 103 pivotally carried by studs 104 riveted to the arms 57 of the bracket 56. The escapement or detent lever 96 is adapted to have an oscillating movement whereby it engages first a tooth 95 of the segment 93 and then a tooth 94 of the segment 92 and so on alternately, and if the segments during such engagement are continually urged in a clockwise direction as viewed in Figs. 8 and 10, they will have imparted to them a step-by-step advancing movement. By coupling the segments 92 and 93 to the heating element assemblage the forward and downward movement of the latter may thus be controlled so that it will also have a step-by-step advance in traversing the slices of bread B.

For the purpose of providing a warming-up interval during which the heating elements 55 may come up to operating temperature before they start their traversing movements, the coupling between the segments 92 and 93 and the heating elements includes a lost-motion connection and a spring means tending to maintain the parts of the lost-motion connection in a predetermined relative position.

Referring to Figs. 8 and 10, the rear portion of the ratchet segment 92 is provided with a cut 105 through which the clamping strip 64 passes, the width of the latter being less than the width of the cut so that a predetermined total amount of clearance exists between the clamping strip and either or both of the opposite edges 106 and 107 of the cut 105. A coil spring 108 is mounted between the segment 92 and the end portion 75 of the clamping strip 64, the spring encompassing the pivot pin 76 and at its ends engaging respectively the clamping strip 64 and the edge 107 of the ratchet segment 92. The coil spring 108 tends to hold the clamping strip 64 in engagement with the edge 106 of the ratchet segment 92 as shown in Fig. 10, and the action of the spring may be overcome by suitable force and the clamping strip held in engagement with the opposite edge 107 of the ratchet segment as shown in Fig. 8.

To provide stops for limiting the movements of the heating elements 55 the arm 57 of the bracket 56 has a pair of inturned tabs 109 and 110 for engagement with the end portion 75 of the clamping strip 64.

Referring to Fig. 8, if the ratchet segments 92 and 93 should be turned counterclockwise they will eventually reach the position shown therein, and will be stopped by engagement between the edge 107 of the segment 92 and the clamping strip 64, and by engagement between the end portion 75 of the clamping strip and the stop tab 109 of the bracket arm 57. These relative positions of the parts are occupied when the toaster is inoperative, and to effect and maintain such positioning a linkage is provided between the ratchet segments 92, 93 and the bread carrier 35. This linkage is in the form of a link bar 111, one end 112 of which is bent at right angles to the bar and is carried in a slot 113, Fig. 2, of a sector plate 114 rigidly and insulatedly carried by the tubular shaft 73. At its forward end the link bar 111 is offset laterally at 115 along a horizontal plane, and is then formed to have the diagonally forward and upward extending portion 116, the end 117 of which is bent at right angles and is received in apertures 118 in the side plates 38 of the bread carrier 35. A cotter pin 119 secures the end portion 117 of the link bar in place against removal from the bread carrier.

The link bar 111 is so arranged that when the bread carrier 35 is in the inoperative bread-projecting position of Fig. 2 the sector plate 114 will be brought to its counterclockwise limit as determined by engagement of the ratchet segment edge 107 with the clamping strip 64 and engagement of the portion 75 thereof with the stop tab 109 of the bracket arm 57. This position of the parts is clearly illustrated in Figs. 2 and 8. When the bread carrier 35 is lowered in the housing 13 to the position shown by the broken lines in Fig. 2, the link bar 111 will occupy the broken line position also shown in this figure, the end 112 of the bar initially resting at the opposite extremity of the arcuate slot 113 of the sector plate 114. When this occurs the coil spring 108 will tend to rotate the ratchet segments 92 and 93 clockwise, and the teeth of the segments will engage the detent lever 96. If this lever should be oscillated, the ratchet segments would have a step-by-step clockwise advancing movement under the urging of the coil spring 108 until the edge 106 of the segment 92 engages the clamping strip 64. Upon this occurring the heating elements 55 will by virtue of their weight tend to continue the clockwise turning of the ratchet segments 92, and since the only resistance offered to such turning is that due to the friction of the pivot pins 69 and 76, which is relatively small, the ratchet segments 92, 93 and the heating elements 55 will continue a step-by-step clockwise turning movement, provided that the oscillations of the detent lever 96 is continued.

In accordance with the present invention a novel actuating device is provided to automatically reciprocate the escapement or detent lever 96 according to a predetermined timing, the said means being operated by an electric current.

Referring to Fig. 5, the escapement lever 96 has an arm 120 extending laterally therefrom adjacent the pivot stud 99, the end of the arm 120 being apertured to carry one end of a helical expansion spring 121 the other end 122 of which is anchored in the base portion 101 of the U-shaped frame 102. The spring 121 thus tends to shift the detent lever 96 in a clockwise direction toward the position shown in broken lines in Fig. 5. The detent lever 96 is actuated in an opposite or counterclockwise direction by a driving link 123 engaging the lever arm 120 adjacent the base thereof and engaging a flange 124 of a fitting 125 which latter has a tubular bearing portion 126 pivotally and insulatedly carried on a stud 127 projecting inwardly from the base portion 101 of the frame 102. The mounting of the fitting 125 is such that the flange 124 thereof may move toward or away from the arm 120 of the detent lever 96. A second fitting 128 similar to the fitting 125 but the opposite thereof has a tubular bearing portion 129 insulatedly and pivotally carried on a stud 130 projecting inwardly from the base portion 101 of the frame 102, and the said fittings 125 and 128 are substantially equispaced from opposite sides of the pivot stud 99 of the detent lever, and are respectively adjacent the ratchet segments 92 and 93. The fitting 128 has a flange 131 corresponding to the flange 124 of the fitting 125, and both of the said flanges are mechanically connected together by a taut heat-expansible wire 132. The fitting 125 has a connector lug 133 extending forwardly through an aperture 134 in the base portion 101 of the frame 102, the said lug being connected with a conductor wire 135. The fitting 128 has a lug 136 extending forwardly through an aperture 137 in the base portion 101 of the frame 102, the said lug being engageable with an eccentrically mounted cam washer 138 of insulating material, which washer is secured to the base portion 101 of the frame by a screw 139 and is adjustably positionable thereon by loosening and tightening the said screw.

According to this construction the pivotal position of the fitting 128 may be adjusted by changing the rotative position of the cam washer 138, the said washer being continually engaged by the lug 136 of the fitting due to continuous pull exerted on the latter by the heat-expansible wire 132. This wire receives its tensioning from the flange 124 of the fitting 125, which flange in turn has pressure continually exerted on it by the driving link 123 receiving pressure from the lever arm 120 which is charged by the expansion spring 121. It will be seen that, should the heat-expansible wire 132 increase and decrease its length due to heating and cooling, this would result in a slight pivotal movement of the fitting 125 about the stud 127, and the shifting of the flange 124 of the fitting would cause a shifting of the lever arm 120, and consequently a shifting of the detent lever 96. Thus, a periodic heating and cooling of the heat-expansible wire 132 will cause an oscillation of the detent lever 96, and the oscillations of the latter are limited by slots 140 and 141 in the arms 103 of the frame 102, into which slots the ends 97 and 98 of the lever respectively extend.

According to the above construction a considerable leverage exists by virtue of the driving link 123 engaging the lever arm 120 adjacent the pivot stud 99 thereof, and as a result of this leverage but little expansion and contraction of the heat-expansible wire 132 is required to operate the detent lever 96 throughout its full path of movement.

Referring to Fig. 5, in completing the electrical connections of the timing or escapement mechanism, the wire 91 is connected to the U-shaped frame 102 as by securing it under the stud 130 and in intimate contact with the base portion 101 of the frame.

To provide for alternate energization and de-energization of the heat-expansible wire 132, the detent lever 96 is made to be resilient, and is provided with rounded contact points 142 and 143 adapted to contact and make electric connection to the flanges 124 and 131 respectively of the fittings 125 and 128. The detent lever 96 is so organized that normally the points 142 and 143 are out of engagement with the flanges 124 and 131. However when either of the end portions 97 or 98 of the detent lever is in engagement with one of the ratchet segments 92, 93, the pressure of the said segments will flex and depress the detent lever and will cause the contact point of the engaged end portion to engage the flange of the associated fitting. In Fig. 9 the ratchet segment 93 is shown in engagement with the end 98 of the detent lever, depressing the said end and causing the contact point 143 thereof to engage the flange 131 of the fitting 128. In Fig. 10 the ratchet segment 92 is shown as being in engagement with the end 97 of the detent lever 96, depressing the said end and causing the point 142 thereof to be in engagement with the flange 124 of the fitting 125.

Referring to Fig. 5, the wires 90 and 135 constitute the lead-in wires from the supply cord 144 of the toaster. Tracing the toaster circuit in Fig. 11, it will be seen that the supply cord 144 branches into the wires 90 and 135, the latter being connected with a line 125a representing the fitting 125. A line 132a connected with the said fitting represents the heat-expansible wire 132; this line connects with a line 128a representing the fitting 128. The wire 91 of the diagram of Fig. 11 is connected with a line 101a representing the base 101 of the frame 102, and the line 101a is connected with lines 100a and 99a, representing respectively the arm 100 of the frame and the pivot stud 99 carried by the arm. The line 99a connects with the detent lever 96 having the contact points 142 and 143.

The operation of the toaster is as follows: Referring to Figs. 1 and 2, the bread carrier 35 is normally in the position shown in full lines. Slices of bread B are inserted in the bread-receiving openings 20 and 21 of the housing 13 and are supported by the bread carrier 35; the latter is then allowed to shift to its operative position upon unlatching the latch mechanism, this latter being accomplished by a slight clockwise turn given to the handle 49. After this shifting has occurred the escapement mechanism is free to operate, and the ratchet segments 92 and 93 will start to turn in a clockwise direction, the segment 92 coming to rest on the end portion 98 of the detent lever 96. This detent lever, during the inoperative condition of the toaster, is normally in the position shown in full lines in Fig. 5, due to the heat-expansible wire being cold and in contracted condition. Upon the ratchet segment 93 resting on the end portion 98 of the detent lever 96 the said end portion will be depressed, and the contact point 143 thereof will engage the flange 131 of the fitting 128. This will complete the circuit through the heating elements 60 of the toaster, and through the heat-expansible wire 132 as is obvious from inspection of Fig. 11. The wire 132 will now heat up and become elongated, thereby enabling the expansion spring 121 to shift the detent lever 96 to the position shown by the broken lines in Fig. 5. This will cause a disengagement of the end portion 98 of the detent lever from the ratchet segment 93, and allow the segment to drop one-half a notch until the ratchet segment 92 engages and depresses the end 97 of the detent lever 96. Referring to Fig. 11, it will be seen that such action deenergizes the heat-expansible wire 132, thereby enabling the latter to cool. In so cooling the wire will contract in its length and cause the detent lever 96 to return to its original or starting position. This reciprocatory movement of the detent lever will be repeated, enabling the ratchet segments, after a small advance movement, to pick up the heating elements 60, and then enabling the assemblage of ratchet segments and heating elements to turn clockwise with a stepped movement so that the bread B is traversed by the elements. It will be noted that the heating elements 60 are at a standstill during the initial movements of the ratchet segments 92, 93, thereby allowing the current which is passing through the elements to heat these to the proper operating temperature and causing a conditioning or drying-out of the bread adjacent the elements before they commence to traverse the slices of bread B. Upon the heating elements 60 completing their traversing movements, the ratchet segments 92 and 93 will have completely passed by the detent lever 96 and therefore the latter will no longer be depressed and the contact points 142 and 143 thereof will remain out of contact with the fittings 125 and 128. Thus, the circuit through the heating elements 60 will be opened and maintained open.

At the time that the toast is to be removed the bread carrier 35 is shifted to its operative bread-projecting position by manipulation of the handle 49, whereupon the toast may be easily lifted out due to its projecting from the housing 13. During such shifting or return of the bread-carrier 35, the link bar 111 will actuate the sector plate 114 in a counterclockwise direction and return the heating elements 60 to their initial or starting position, and return the ratchet segments 92, 93 to starting position, preparatory to starting the cycle over again with fresh slices of bread when this should be desired. During the counterclockwise returning movement of the ratchet segments 92, 93, one or both of these may engage the detent lever 96. However, due to the pivotal mounting of the frame 102 the latter will swing and shift the detent lever away from the ratchet segments under the pressure of the sloping faces of the teeth 94, 95 on the lever, so that the segments may return to their starting positions. Normally the frame 102 is spring-urged to an adjustable position which provides for engagement of the segments 92, 93 with the lever 96, as will be now explained.

For the purpose of adjusting or regulating the escapement mechanism an adjustment lever 145 is pivotally mounted on the base portion 58 of the bracket 56 by means of a screw 146, one end 147 of the lever extending through a slot 148 in the rear of the housing 13 and projecting therefrom. The other end 149 of the lever has a curved camming surface eccentric with the pivot screw 146 and engageable with a flap 150 struck from the base portion 101 of the frame 102. Referring to Fig. 5, an expansion spring 151 is provided, anchored to one arm 57 of the bracket 56 and connected with a lug 152 on an adjacent arm 103 of the frame 102. The spring 151 maintains the flap 150 of the frame in engagement with the cam edge of the adjustment lever 145. By this organization it is possible, through shifting of the adjustment lever 145, to vary the pivotal position of the frame 102 with respect to the bracket 56 and therefore vary the relative positions of the detent lever 96 and ratchet segments 92, 93. Therefore the portions 97 and 98 of the detent lever 96 may be made to enter the notches of the ratchet segments more or less deeply, and this regulates the time of engagement of the lever with the teeth 94 and 95, and consequently the time of energization and deenergization of the heat-expansible wire 132 and the upper and lower temperature limits of the wire. Due to the shorter or longer individual periods of engagement of the lever 96 with the teeth 94 and 95, the total of these periods or the overall timing of the escapement is shorter or longer, thereby providing an adjustment of the toasting of the bread.

As shown in Fig. 2, the weight of the heating elements 60 and ratchet segments 92, 93 may be supplemented by an expansion spring 155 having one end connected with the ratchet segment 93 and the other end insulatedly connected with a hook 156 struck from the base portion 58 of the bracket 56.

If desired the heating elements 60 may be supported intermediate their ends by means of arms 157 having reduced end portions extending between adjacent coils of the elements, the said arms being insulatedly mounted on the supporting bars 62.

Although the wand-shaped heating elements 60 traverse the slices of bread B with a pivotal movement which results in the upper portions of the heating elements having a greater linear speed and traversing a larger area of bread than the lower portions, the uniformity of the toasting is not substantially affected by this condition. It has been found that the spacing of the convolutions of the wire of the heating elements 60 throughout their length may be uniform and equal, and that the steps of angular advance of the elements, as determined by the spacing between consecutive teeth 94, and consecutive teeth 95 of the ratchet segments may be uniform and equal, and still result in a substantially uniform toasting of the bread slices B. Of course, for certain special conditions it may be desirable to progressively diminish the spacing between the convolutions of the heating wire in the upper portions of the heating elements so that more heat is concentrated at the upper portions of the elements or vice versa, or the spacing between successive teeth 94 and also successive teeth 95 may be progressively increased in the upper portions of the ratchet segments 92, 93, thereby to increase the speed of traverse of the heating elements as the latter approach their lowermost positions; under ordinary circumstances, however, such differential spacing is not indicated.

An advantageous feature of the toaster of the present invention resides in the fact that after the toasting of the bread slices B has been completed, should the slices not be immediately removed but instead left in the bread carrier and the latter left in deep operative position in the housing, the slices will not be exposed and therefore not subjected to cooling influences as is the case with pop-out toasters, nor will they be further toasted. Instead, since the bread slices remain entirely encompassed by the housing 13, the moderate heat trapped in the housing will maintain the bread warm for a short interval until it is removed for use.

A further advantageous feature of the present improved toaster is that the pressure required to actuate the bread carrier 35 is extremely small and may be easily supplied without appreciable effort. For example, when the bread B has been inserted in the toaster and it is desired to shift the bread carrier 35 to its operative position, all that it is necessary to do is to release the bread-carrier latch by turning the handle 49. This release is easily effected, and once the latch is released the bread carrier will automatically be shifted to its operative position, due to the action of gravity and also the action of the expansion spring 44 if the latter be employed. When the toasted bread is to be ejected and removed from the toaster the pressure required on the handle 49 to shift the bread carrier to inoperative bread-projecting position is merely that necessary to overcome the action of gravity, and also the force required to return the heating elements 60 to their initial or starting position against the restraint of the spring 155. Since this latter spring is also very light, the sum and total of all of these forces does not amount to a great deal, so that the return of the bread carrier to inoperative position may be accomplished without considerable effort. This is quite different from toasters having spring-loaded timing mechanisms wherein a strong spring is provided to operate the escapement, and wherein the loading of this strong spring must be supplied by the operator of the toaster during each cycle of operation.

Moreover, the total path of travel of the handle 49 in actuating the bread carrier 35, as clearly illustrated in Fig. 2, is relatively short, thereby resulting in a more convenient operation of the toaster than that obtained in prior devices wherein the actuating handle must be moved through a relatively great distance.

The latching mechanism associated with the handle 49 positively locks the bread carrier 35 in its inoperative bread-projecting position, and therefore locks the toaster in "off" position. There is thus avoided the likelihood of the bread carrier being inadvertently shifted during handling or transportation of the toaster, and the latter prematurely set to "on" position. This condition would be undesirable in that it might result in the bread being subsequently improperly deposited in the shifted bread carrier, thereby causing a non-uniform toasting if the heating elements should not traverse all of the bread surfaces during their operative movements.

To enable the toaster to be conveniently handled, the center section 15 of the housing 13 at the rear thereof is provided with projecting arms 158 which mount a handle 159, the said arms and handle being similar in appearance to the arms 46 and handle 49 to provide for symmetry of design.

A modification of the invention, wherein a different method of energizing the heating elements 60 and energizing and deenergizing the heat-expansible wire 132 is employed, is shown in Figs. 12 through 14.

Referring to Figs. 13 and 14, an auxiliary switch 160 is provided in series with the heating element circuit. The said switch comprises a pair of resilient upstanding arms 161 and 162 at their lower portions insulatedly mounted by means of a screw 163 and nut 164 on a bracket 165 secured to the base portion 58 of the U-shaped bracket 56. The upper ends of the switch arms 161 and 162 have suitable contact points, and the switch arm 161 has an insulating shoe 166 having opposite cam faces 167 and 168 engageable with a camming edge 169 integral with the sector plate 114. For this modification the connections in the toaster as previously described are changed as follows: The wire 90 from the supply cord 144 is connected with the switch contact arm 161 instead of directly to the bearing screw 70, and the latter is connected by a wire 170 to the switch contact arm 162. Also, the pivotally mounted fitting 128 which anchors the heat-expansible wire 132 is connected by a wire 171 to the base portion 101 of the frame 102. This in effect connects it with the wire 91 leading from the bearing screw 77, which connects with one end of the series-connected heating elements 60. A further change is made in that the end portion 98 of the detent lever 96 is not provided with an embossed nib, but instead an anti-friction nib 143a is provided on the flange 131 of the fitting 128 for sliding engagement with the lever. Also, a flat insulating sleeve 172 is provided on the lever 96 to prevent inadvertent electrical contact from being made between the latter and the contact blade 162.

According to this modification of the invention, when the end portion 97 of the detent lever 96 is out of engagement with the flange 124 of the fitting 125, the circuit through the heating elements 60 is completed by current passing through the wire 91, wire 171, heat-expansible wire 132 and thence through the conductor 135 of the supply cord 144. This causes heating of the heat-expansible wire, and shifts the detent lever to its opposite position wherein the ratchet segment 92 engages the end portion 97 of the detent lever. The end portion 97 thus is made to engage the flange 124 of the fitting 125, and current in the heating element circuit thus passes directly from the wire 91 to the wire 135 of the supply cord, thereby by-passing the heat-expansible wire 132 and allowing the latter to cool. This cycle of operations is repeated the necessary number of times to enable the ratchet segments of the escapement to by-pass completely the detent lever 96, whereupon the circuit will be permanently opened by disengagement of the switch shoe 166 from the camming edge 169 of the sector plate 144.

At the start of the toasting cycle the circuit through the heating elements 60 is completed in response to initial clockwise movement of the ratchet segments 92, 93 and sector plate 114, the camming edge 169 of the said plate engaging the switch shoe 166 and causing the switch arms 161 and 162 to engage each other. The connection thus made, of course, immediately energizes the heating elements 60 and the heat-expansible wire 132 and the escapement starts its operation while the heating elements 60 remain at a standstill for a short period during which they attain normal operating heat.

An advantage of this modified form of circuit control is that during the operation of the escapement, the circuit through the heating elements 60 is not periodically interrupted as is the case with the circuit shown in Fig. 11. Also, the arcing and load on the contact nib 142 and flange 124 of the bracket 125 are now inconsiderable, and greatly reduced below that carried in the circuit of Fig. 11.

It will be seen that by the above construction, should the toaster have to be disassembled at any time for repairs, replacement of parts, adjustment or any other reason, this may be readily accomplished without dismantling it piece by piece. For example, the screws 17 which hold the housing 13 to the base 10 may be first removed, whereupon the housing and the grating assembly 23 carried thereby, together with the bread carrier 35 may be lifted off the base 10 a slight extent, as a unit. By so lifting the housing 13, access may be had to the link bar 111, and the rear extremity of the latter may be shifted laterally and disengaged from the sector plate 114. This disengaging movement may be quickly and conveniently accomplished, and does not require tools being inserted into the housing while the latter and the base 10 are juxtaposed. After the link bar 111 has been disengaged from the sector plate 114 the housing 13 may be readily manipulated to completely remove it from the base 10 and from the heating element and escapement subassembly carried by the base. The said subassembly is thus exposed on all sides and readily accessible for repair and for a check of its operation, since, considering the latter, it may be operated throughout its cycle any number of times desired by merely manually returning of the heating element assemblies to their starting positions whenever they complete a traversing movement.

Variations and modifications may be made within the scope of this invention and portions of the improvements may be used without others.

I claim:

1. In an electric toaster, a bread carrier movable between an inoperative bread-receiving position and an operative bread-toasting position; a heating element adjacent the bread carrier, means supporting said element for movement; means for moving the element from a starting position to traverse a slice of bread supported in the carrier when the latter is in operative position; and means for returning the heating element to starting position in response to movement of the bread carrier to inoperative position.

2. In an electric toaster having a heating element movable from a starting position to a finishing position to traverse a slice of bread, an escapement for controlling the movement of the heating element including rack means movable with the element; a detent oppositely movable between two positions, and engageable with either of different teeth of the rack means when in one or the other position respectively, said detent and rack means being arranged to enable the heating element to have a step-by-step traversing movement in response to movements of the detent; means including a heat-expansible wire for actuating the detent in one direction or the other; and contact means for automatically alternately electrically energizing and deenergizing the wire to heat it during repeated intervals and oscillate the detent.

3. In an electric toaster having a heating element movable from a starting position to a finishing position to traverse a slice of bread, an escapement for controlling the movement of the heating element including rack means movable with the element; a detent oppositely movable between two positions, and engageable with either of different teeth of the rack means when in one or the other position respectively, said detent and rack means being arranged to enable the heating element to have a step-by-step traversing movement in response to movements of the detent; means including a heat-expansible wire for actuating the detent in one direction or the other; contact means for automatically alternately electrically energizing and deenergizing the wire to heat it during repeated intervals and oscillate the detent; and means for altering the time of engagement between the detent and the individual teeth of the rack means, thereby to regulate the speed of the escapment.

4. In an electric toaster, an elongate heating element automatically movable laterally from a starting position to a finishing position to traverse a slice of bread; an escapement for controlling the movement of the heating element; a plural-part lost-motion driving connection between the escapement and the heating element; spring means yieldably holding the parts of the driving connection in a predetermined position with respect to each other; and means for energizing the heating element during the operation of the escapement said lost-motion connection and spring means operating to hold the heating element temporarily at a standstill during initial movements of the escapement, thereby to enable the element to heat up prior to its traversing movement.

5. In an electric toaster, a bread carrier movable between an inoperative bread-receiving position and an operative bread-toasting position; a heating element adjacent the bread carrier, means supporting the said element for movement; means for moving the element from a starting position to traverse a slice of bread supported in the carrier when the latter is in operative position; and means including a mechanical, lost-motion driving connection for returning the heating element to starting position in response to movement of the bread carrier to inoperative position.

6. In an electric toaster having a heating element movable from a starting position to a finishing position to traverse a slice of bread, an escapement for controlling the movement of the heating element, including a pair of rack strips movable with the element and rigid with each other; a detent oppositely movable between two positions, and engageable with the teeth of one rack strip or the other when in one or the other position, the said detent and strips being arranged to enable the heating element to have a step-by-step traversing movement in response to movements of the detent; means including a heat-expansible wire for actuating the detent in one direction or the other; and contact means for automatically alternately electrically energizing and deenergizing the wire to heat it during repeated intervals and reciprocate the detent.

7. In an electric toaster having a heating element movable from a starting position to a finishing position to traverse a slice of bread, an escapement for controlling the movement of the heating element including rack means movable with the element; a detent oppositely movable between two positions, and engageable with either of different teeth of the rack means when in one or the other position respectively, said detent and rack means being arranged to enable the heating element to have a step-by-step traversing movement in response to movements of the detent; means including a heat-expansible wire for actuating the detent in one direction or the other; contact means for automatically alternately electrically energizing and deenergizing the wire to heat it during repeated intervals and oscillate the detent; and means for adjustably positioning the detent with respect to the rack means, thereby to regulate the speed of the escapement.

8. In an electric toaster, a bread carrier movable between an inoperative bread-receiving position and an operative bread-toasting position; an elongate heating element, means automatically moving said element laterally from a starting position to a finishing position to traverse a slice of bread carried in the bread carrier when the latter is in operative position; and means including a lost-motion driving connection between the bread carrier and the heating element, whereby, after completion of a traversing movement of the heating element the latter is returned to starting position by movement of the bread carrier to inoperative position.

9. In an electric toaster, a bread carrier movable between an inoperative bread-receiving position and an operative bread-toasting position; a heating element adjacent the bread carrier, means supporting the said element for movement; means for moving the element from a starting position to traverse a slice of bread supported in the carrier when the latter is in operative position; means for automatically causing the heating element to traverse the bread in response to movement of the bread carrier to operative position; and means for returning the heating element to starting position in response to movement of the bread carrier to inoperative position.

10. In an electric toaster a heating element automatically movable from a starting position to a finishing position to traverse a slice of bread; an escapement for controlling the movement of the heating element, including a pair of rack strips having a lost-motion connection with the heating element, the said strips being rigid with each other; spring means yieldably holding the rack strips in a predetermined position with respect to the heating element; a detent oppositely movable between two positions, and engageable with the teeth of one rack strip or the other when in one or the other position, the said detent and strips being arranged to enable the heating element to have a step-by-step traversing movement in response to movements of the detent; means including a heat-expansible wire for actuating the detent in one direction or the other; contact means for automatically alternately electrically energizing and deenergizing the wire to heat it during repeated intervals and oscillate the detent; and means for energizing the heating element during the operation of the escapement, the said lost-motion connection and spring means operating to hold the heating element temporarily at a standstill during initial movements of the escapement, thereby to enable the element to heat up prior to its traversing movement.

11. In an electric toaster, a movable bread-carrier movable between an inoperative bread-receiving position and an operative bread-toasting position; an elongate heating element adjacent the bread carrier, and a circuit for the element, means whereby the said element is laterally movable from a starting position to traverse a slice of bread, supported by the carrier, when the latter is in operative position; and a control device including switch means responsive to movement of the bread carrier for controlling the heating element circuit, and including means responsive to positioning of the bread carrier for controlling the movements of the heating element whereby the heating element circuit is maintained open when the bread carrier is in inoperative position, is closed as a result of movement of the bread carrier to operative bread-toasting position, and is opened when the heating element completes its traverse of the bread in the carrier.

12. In an electric toaster, a movable bread carrier movable between an inoperative bread-receiving position and an operative bread-toasting position; a heating element adjacent the bread carrier, the said element being movable from a starting position to traverse a slice of bread, supported by the carrier, when the latter is in operative position; means associated with the bread carrier and the heating element for enabling the latter to begin its traversing movement only when the carrier is out of the said bread-receiving position; and a manually operable latch for releasably locking the bread carrier in bread-receiving position, said carrier moving automatically to operative bread-toasting position when the latch is released.

13. In an electric toaster, a movable bread carrier movable between an inoperative bread-receiving position and an operative bread-toasting position; a heating element adjacent the bread carrier, means supporting the said element for movement; means for moving the element from a starting position to traverse a slice of bread, supported by the carrier, when the latter is in operative position; and means connected between the bread carrier and the heating element for blocking traversing movement of the latter when said carrier is in bread-receiving position.

14. In an electric toaster, a movable bread carrier movable between an inoperative bread-receiving position and an operative bread-toasting position; a heating element adjacent the bread carrier, means supporting the said element for movement; means for moving the element from a starting position to traverse a slice of bread, supported by the carrier, when the latter is in operative position; and a lost-motion driving connection between the bread carrier and the heating element, the said connection enabling the element to begin its traversing movement only when the carrier is out of the said bread-receiving position, and the carrier being moved automatically to operative bread-toasting position when out of bread-receiving position.

15. In an electric toaster, a movable bread carrier movable between an inoperative bread-receiving position and an operative bread-toasting position; a heating element adjacent the bread carrier, means supporting the said element for movement; means for moving the element from a starting position to traverse a slice of bread, supported by the carrier, when the latter is in operative position; and a lost-motion driving connection between the bread carrier and the heating element, for returning the latter to starting position in response to movement of the bread carrier to bread-receiving position, and the bread carrier and heating element being unidirectionally independently movable respectively the one after the other through their paths of travel.

16. In an electric toaster, a bread carrier movable between an operative bread-toasting position and an inoperative bread-receiving position; means continually urging the carrier from inoperative to operative position; a heating element; means movably mounting the heating element adjacent the bread carrier; a circuit for the element; control means for said circuit; means for actuating said control means to automatically close the circuit in response to movement of the bread carrier to its operative position; means automatically causing the heating element to traverse the bread carrier when the carrier is stationary in operative position, thereby to toast different surfaces of the bread, said control-actuating means maintaining the circuit closed during such traversing movement; and means actuating the control means to open the circuit upon completion of said traversing movement.

17. In an electric toaster, a bread carrier movable between an operative bread-toasting position and an inoperative bread-receiving position; means continually urging the carrier from inoperative to operative position; a heating element; means movably mounting the heating element adjacent the bread carrier; a circuit for the element; control means for said circuit; means for actuating said control means to automatically close the circuit in response to movement of the bread carrier to its operative position; means automatically causing the heating element to traverse the bread carrier when the carrier is stationary in operative position, thereby to toast different surfaces of the bread, said control-actuating means maintaining the circuit closed during such traversing movement; and means actuating the control means to open the circuit upon completion of said traversing movement, and to maintain the circuit open when the bread carrier is shifted to an inoperative, bread-receiving position.

GEORGE HAMLIN LEONARD.

REFERENCES CITED

The following references are of record in the file of this patent:

UNITED STATES PATENTS

| Number | Name | Date |
| --- | --- | --- |
| 1,697,914 | Hummel et al. | Jan. 8, 1929 |
| 1,954,895 | Shenton | Apr. 17, 1934 |
| 2,042,226 | Harpster | May 26, 1936 |
| 2,046,472 | Lavenburg | July 7, 1936 |
| 2,114,000 | Vidaver | Apr. 12, 1938 |
| 2,253,637 | McCullough | Aug. 26, 1941 |
| 2,262,285 | Ireland | Nov. 11, 1941 |
| 2,285,231 | Scharf | June 2, 1942 |